United States Patent Office 2,995,433
Patented Aug. 8, 1961

2,995,433
SOIL IMPROVEMENT
Mayer B. Goren and Bobby G. Marquardt, Oklahoma City, Okla., assignors to Kerr-McGee Oil Industries, Inc., a corporation of Delaware
No Drawing. Filed May 24, 1956, Ser. No. 586,897
5 Claims. (Cl. 71—1)

This invention relates to improvements in the growing of plants and more particularly to a plant growth promoter and a process for promoting the growth of plants in soil.

It is desirable in many instances to provide a treating material and a process for treating soil which will improve the tilth of soil and at the same time act as a fertilizer or plant growth promoter. While numerous soil conditioning materials have been known heretofore, the prior art materials have had many undesirable features. For example, the price of acrylates, recently placed on the market for this purpose, is beyond the economic range for use in normal agricultural practices. Further, none of the prior art materials used in the treatment of soil heretofore have been able to combine the advantages of low cost and an ability to improve the tilth of soil, exhibit a nematocidal effect, control insects, and also act as a plant fertilizer or growth promoter.

The present invention provides an economical treating or conditioning agent for soil and a method for treating soil whereby many of the prior art disadvantages are overcome. We have discovered that when a soil is treated with petroleum residue, preferably as fines, the tilth of the soil is improved and plants such as fruits, vegetables, etc. grown in the treated soil produce a more rank growth of roots, stalk and leaves, as well as exhibiting unusually high resistance to insects, disease and adverse weather conditions, such as cold, drought, and weather beating due to wind and dust erosion. We have further discovered that plants grown in soil thus treated bloom earlier and have ripe mature fruit at an earlier date.

Accordingly, it is a principal object of the present invention to provide an improved soil and an economical process for treating soil.

Still other objects of the invention will be apparent to those skilled in the art as the invention is better understood by reference to the detailed description and the example appearing hereinafter.

Soil conditioning agents suitable for treating soils in accordance with the invention are solid petroleum residues having a relatively low oil content and softening points in excess of 160° F. Such petroleum residues may be made by any number of suitable methods well known to the art and the manner of their preparation does not comprise a part of this invention. However, a preferred method for their preparation is described in copending U.S. patent application Serial No. 435,944, filed June 10, 1954, now abandoned in favor of application Serial No. 632,381, filed January 3, 1957, and Serial No. 377,201, filed August 28, 1953, now abandoned in favor of application Serial No. 631,351, filed December 28, 1956. Applications Serial Nos. 631,351 and 632,381 also are now abandoned, and the subject matters of these applications were combined and refiled as application Serial No. 794,369, filed February 19, 1959, now U.S. Patent 2,940,920. The solid friable petroleum residues thus prepared, namely petroleum resins and/or asphaltenes, have softening points in excess of 250° F., penetrations less than 10, and are substantially oil-free. The asphaltenes, which are preferred in most instances have softening points of 300° F. or higher and penetrations of less then 2.

In treating soils in accordance with the process of the invention, the friable substantially oil-free petroleum residues are preferably applied to the soil as fines and in such a manner as to uniformly incorporate the petroleum residues predominately in the top soil layer. This may be accomplished by any suitable method, such as by applying the petroleum residues to the soil surface and then tilling the top soil with conventional farm implements, or in the case of small plots or hothouse boxes, the petroleum residues may be mixed with the soil with any of a number of suitable hand tools. The preferred rate of application is usually at the rate of about 1 ton per acre for most soils. However, larger amounts may be applied such as 3 tons per acre or greater, or quantities as low as ¼ ton per acre or smaller. It is also possible to apply the friable substantially oil-free petroleum residues in larger size particles than fines, and in such case the effectiveness of the petroleum residues may be extended over a number of years. After the friable substantially oil-free petroleum residues are incorporated in the top soil, seed beds are prepared in the usual manner and the crop, such as fruits, vegetables, etc., is then planted and cultivated in accordance with the usual recommended agricultural practices.

Still another method of applying hard friable substantially oil-free petroleum residues to the soil as fines is by adding the fines to commercial mineral fertilizers such as sodium nitrate, ammonium or potassium sulfate, calcium acid phosphate, and their mixtures. When added to mineral fertilizer, the fines of petroleum residue serve as a filler material for the concentrated mineral fertilizer and prevent caking of the fertilizer due to moisture adsorption in addition to being a soil conditioning agent after the fertilizer is incorporated into the soil. The amount of petroleum residue applied per acre by this method is dependent upon the percentage of petroleum residue present in the particular fertilizer mixture and the rate at which the fertilizer mixture is applied to the soil. In some instances quantities of petroleum residue considerably less than ¼ ton per acre may be applied by this method.

Plants grown on treated soil quickly develop an extensive root system and grow at a much more rapid rate than plants grown in untreated soil. The root systems of plants from treated soil are characterized by longer tap and feeder roots and more extensive root hairs along the major feed root systems. The plants also develop a dark green color and a more vigorous and healthy appearance. Further the plants from treated soil show greater resistance to adverse weather conditions, the survival rate being higher after periods of cold weather, wind and dust erosion, and drought. This may be due in part to the extensive root system discussed above.

The plants from treated soil are also characterized by a greatly improved resistance to disease and insects. It was observed that both the foliage and the root system are remarkably free of discoloration, lesions, and other evidence of the common plant diseases. The plants are particularly resistant to insects, such as cut worms, etc. which attack the foliage, stalk, or root system of the plant.

The growth promoting property of solid oil-free petroleum residues incorporated in the top soil in accordance with the process of the invention is not fully understood. It is thought that perhaps the difference in growth and resistance to insects and disease, which is characteristic of plants grown in the treated soil, may be due to a latent mematocidal activity in the petroleum residues and/or to the presence of nitrogen, sulphur, and possibly trace metals in organic form. However, other theories may be advanced, and it may only be said that the precise reason or reasons for the improvement described herein remains to be proven.

The following specific example is for the purpose of illustrating a presently preferred embodiment of the invention and is not limiting to the scope thereof which is set forth in the appended claims.

Example

Typical greenhouse seed flats were filled with a loamy soil and then the flats divided by means of a partition. One side of each flat was retained and used as a control without further soil treatment, and the other side of each flat was treated by incorporating petroleum asphaltenes with the soil at the rate of one ton per acre and used for the purpose of this experiment. Each half of the flat was divided into four rows spaced two inches apart and one inch from the outside edge of the flat. Then twenty-five seeds were planted in each row. One row of each half of the flat was planted to tomatoes, cucumbers, musk melon and peppers. The flats were watered at suitable intervals and when the plants were six weeks old they were transplanted from the seed beds to the field.

Observation of the plants during the six weeks they were in the greenhouse showed plants in treated soil had a greener color and more rank foliage and stalk. At the end of the six weeks greenhouse period, examination of the roots of these plants showed the plants from treated soil had much longer tap and feeder roots, including extensive root hairs along the major feed root systems. Observation of these same plants after transplanting to the field showed the plants from treated soil exhibited greater resistance to cold weather, wind and dust erosion, and greater resistance to disease and insects. The treated plants which survived the cold weather were further distinguished from the plants from untreated soil in that they grew faster, bloomed earlier, and had ripe mature fruit by a least one week earlier.

What is claimed is:

1. A process for promoting the growth of plants in soil consisting essentially of the step of admixing into soil friable substantially oil-free petroleum residue in solid particulate form in an amount not less than about one-quarter ton per acre to form an admixture wherein said petroleum residue is distributed within said soil in solid particulate form, the petroleum residue consisting essentially of at least one substance selected from the group consisting of asphaltenes and petroleum resins.

2. A process for promoting the growth of plants in soil consisting essentially of the step of admixing into said soil friable substantially oil-free petroleum asphaltenes in solid particulate form in an amount not less than about one-quarter ton per acre to form an admixture wherein said asphaltenes are distributed within said soil in solid particulate form.

3. A process for promoting the growth of plants in soil consisting essentially of the step of admixing into said soil friable substantially oil-free petroleum asphaltenes in the form of solid fines in an amount of about one to three tons per acre to form an admixture wherein said asphaltenes are distributed within said soil in solid particulate form.

4. A process for promoting the growth of plants in soil consisting essentially of the step of admixing into said soil friable substantially oil-free petroleum resins in solid particulate form in an amount not less than about one-quarter ton per acre to form an admixture wherein said resins are distributed within said soil in solid particulate form.

5. A process for promoting the growth of plants in soil consisting essentially of the step of admixing into said soil friable substantially oil-free petroleum resins in the form of solid fines in an amount of about one to three tons per acre to form an admixture wherein said resins are distributed within said soil in solid particulate form.

References Cited in the file of this patent

UNITED STATES PATENTS

| | | |
|---|---|---|
| 1,864,672 | Rose et al. | June 28, 1932 |
| 1,988,175 | Merrill | Jan. 5, 1935 |
| 2,333,959 | Smith | Nov. 9, 1943 |
| 2,414,640 | Fischer | Jan. 21, 1947 |
| 2,829,040 | Darin et al. | Apr. 1, 1958 |
| 2,851,824 | Campbell | Sept. 16, 1958 |
| 2,927,402 | Goren et al. | Mar. 8, 1960 |

OTHER REFERENCES

Soil Science Soc. of Amer. Proceedings, W. S. Chepil, pub. April 1955, vol. 19, No. 2, pages 125–128.

Better Roads—Asphalt Mulch for Roadside Growth, Fred R. Bruto, vol. 15, No. 12, December 1945, pages 27–27.